US010220374B2

(12) United States Patent
Bhan

(10) Patent No.: US 10,220,374 B2
(45) Date of Patent: *Mar. 5, 2019

(54) ACTIVATION OF A SELF-ACTIVATING HYDROPROCESSING CATALYST WITH STEAM

(71) Applicant: SHELL OIL COMPANY, Houston, TX (US)

(72) Inventor: Opinder Kishan Bhan, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,402

(22) Filed: Apr. 22, 2014

(65) Prior Publication Data

US 2014/0323293 A1 Oct. 30, 2014

Related U.S. Application Data

(60) Provisional application No. 61/815,455, filed on Apr. 24, 2013.

(51) Int. Cl.

| B01J 38/06 | (2006.01) |
|---|---|
| B01J 23/90 | (2006.01) |
| B01J 27/02 | (2006.01) |
| B01J 37/04 | (2006.01) |
| B01J 23/94 | (2006.01) |
| B01J 23/883 | (2006.01) |
| B01J 37/00 | (2006.01) |

(52) U.S. Cl.
CPC ............ *B01J 27/02* (2013.01); *B01J 23/883* (2013.01); *B01J 23/94* (2013.01); *B01J 37/0036* (2013.01); *B01J 37/04* (2013.01); *B01J 38/06* (2013.01)

(58) Field of Classification Search
None
See application file for complete search history.

(56) References Cited

U.S. PATENT DOCUMENTS

| 3,519,573 A * | 7/1970 | Coe .................. B01J 21/00 208/216 R |
| 3,720,602 A * | 3/1973 | Riley .................. C10G 45/08 208/216 R |
| 4,485,008 A | 11/1984 | Maa et al. |
| 4,738,944 A | 4/1988 | Robinson et al. |
| 4,795,726 A * | 1/1989 | Schaper et al. .......... 502/26 |
| 4,906,357 A | 3/1990 | Drori |
| 5,025,859 A | 6/1991 | Hanson et al. |
| 5,171,921 A * | 12/1992 | Gaffney et al. ............ 585/653 |
| 5,377,756 A | 1/1995 | Northrop et al. |
| 7,708,058 B1 | 5/2010 | Gipson |
| 7,824,541 B2 * | 11/2010 | Bhan .................. C01G 45/08 208/243 |
| 7,871,513 B1 | 1/2011 | Bhan |
| 8,114,806 B2 | 2/2012 | Bhan et al. |
| 9,114,386 B2 * | 8/2015 | Bhan .................. B01J 23/883 |
| 2008/0050792 A1 | 2/2008 | Zmierczak et al. |
| 2008/0308280 A1 | 12/2008 | Head |
| 2009/0056953 A1 | 3/2009 | Korach et al. |
| 2009/0114386 A1 | 5/2009 | Hartog et al. |
| 2009/0255850 A1 * | 10/2009 | Bhan et al. ................ 208/15 |
| 2010/0000908 A1 | 1/2010 | Markkanen et al. |
| 2010/0025823 A1 | 2/2010 | Collazo et al. |
| 2010/0126727 A1 | 5/2010 | Vinegar et al. |
| 2010/0224535 A1 * | 9/2010 | Maity et al. .............. 208/143 |
| 2010/0326888 A1 | 12/2010 | Xu et al. |
| 2011/0068047 A1 | 3/2011 | Gudde et al. |
| 2011/0073523 A1 | 3/2011 | Cui et al. |
| 2011/0210045 A1 | 9/2011 | Kou et al. |
| 2012/0017496 A1 | 1/2012 | Yao et al. |
| 2013/0105357 A1 * | 5/2013 | Bhan .................. B01J 27/19 208/46 |
| 2014/0262240 A1 | 9/2014 | Boone et al. |

FOREIGN PATENT DOCUMENTS

| EP | 0204354 | 12/1986 |
| EP | 0342759 | 11/1989 |
| EP | 2182047 | 5/2010 |
| GB | 2512122 | 9/2014 |
| WO | 200011112 | 3/2000 |
| WO | 2006029456 | 3/2006 |
| WO | 2010000908 | 1/2010 |
| WO | 20101111168 | 9/2010 |
| WO | WO2010/111168 | * 9/2010 |
| WO | 2010121367 | 10/2010 |
| WO | 2013063219 | 5/2013 |
| WO | 2013163126 | 10/2013 |

OTHER PUBLICATIONS

International Search Report for PCT/US2011/066223 dated Jan. 17, 2013; 7 pages.
Van Der Drift et al.; "Entrained Flow Gasification of Biomass-Ash Behavior, Feeding Issues and System Analysis"; Retrieved from URL:http://www.ecn.nl/docs/library/report/2004/c04039.pdf.

* cited by examiner

*Primary Examiner* — Melvin C. Mayes
*Assistant Examiner* — Colette B Nguyen
(74) *Attorney, Agent, or Firm* — Charles W. Stewart

(57) ABSTRACT

A self-activating hydroprocessing catalyst for treating heavy hydrocarbon feedstocks is further activated by contacting the self-activating catalyst with steam. The steam may be added to the heavy hydrocarbon feedstock prior to contacting with the self-activating catalyst or may be added to a reactor vessel containing the self-activating catalyst.

8 Claims, 1 Drawing Sheet

ACTIVATION OF A SELF-ACTIVATING HYDROPROCESSING CATALYST WITH STEAM

This non-provisional application claims the benefit of U.S. Provisional Patent Application Ser. No. 61/815,455, filed Apr. 24, 2013, the disclosures of which are incorporated herein by reference.

This invention relates to the further activation of a self-activating hydroprocessing catalyst employed in the treatment of heavy hydrocarbon feedstocks.

In the refining of crude oils the heavy cuts including residue often are subjected to catalytic hydroprocessing to remove such components as sulfur, nitrogen, metals, and Conradson carbon through desulfurization, denitrogenation, demetallization, or asphaltene conversion or any combination thereof. Various types of heterogeneous hydroprocessing catalysts are used to promote these reactions by contacting the catalyst with feedstock under conditions of elevated temperature and pressure and in the presence of hydrogen.

A recently developed class of hydroprocessing catalysts having excellent catalytic activity and stability making them highly suitable for treating heavy hydrocarbon feedstocks are self-activating hydroprocessing catalysts. Such self-activating catalysts are described, for example, in U.S. application Ser. No. 13/660,879, filed Oct. 25, 2012, which is incorporated by reference herein in its entirety.

It is an ongoing desire to provide means and methods for improving the activity of hydroprocessing catalysts.

Accordingly, provided is a method for activating a self-activating hydroprocessing catalyst used in treating a heavy hydrocarbon feedstock, wherein the method comprises contacting the self-activating hydroprocessing catalyst with steam.

Figure 1:
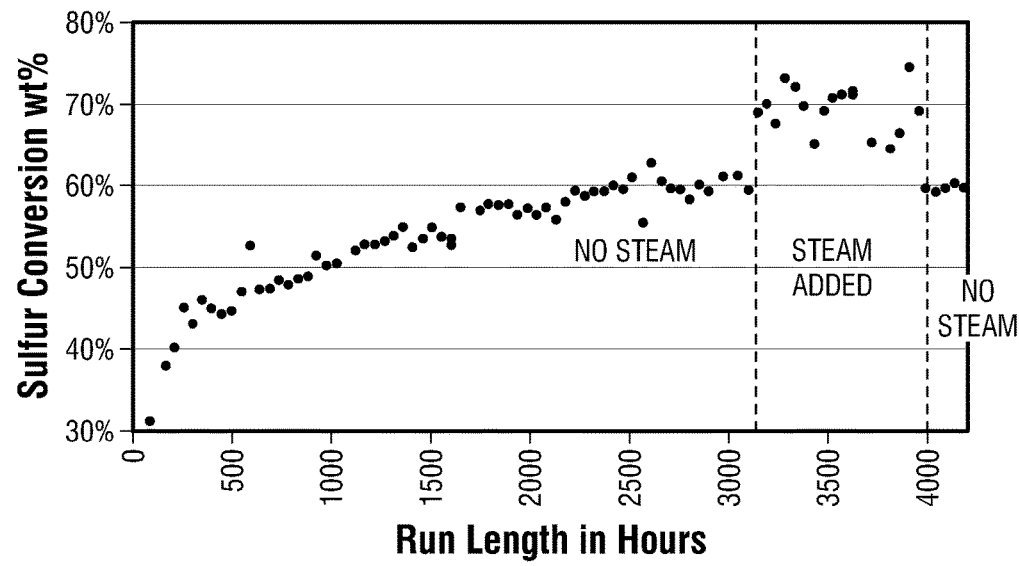

FIG. 1 presents a plot of the total sulfur conversion versus run length in hours for a self-activating hydroprocessing catalyst, with and without the addition of steam. The data points shown are the weight percent conversion of the total sulfur in the residue feedstock at various times during the run.

Figure 2:
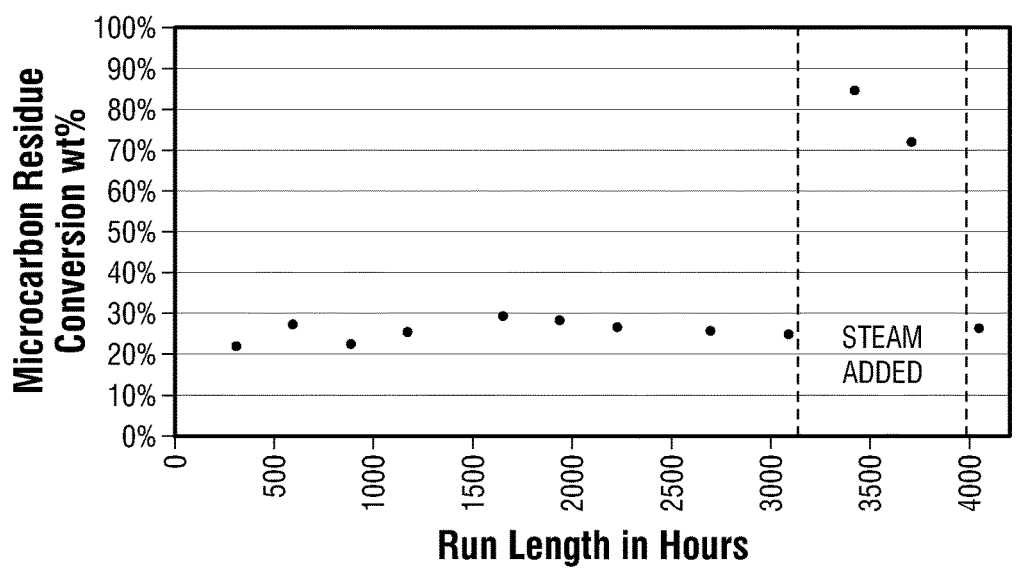

FIG. 2 presents a plot of the microcarbon residue (MCR) conversion with and without steam addition. The data points shown are the weight percent MCR conversion at various times during the run.

While the aforementioned self-activating hydroprocessing catalysts have been shown to have excellent hydroprocessing activity, it has now been found that the activity of these self-activating catalysts can be further improved by exposing these catalysts to steam. This surprising discovery forms the basis of the present method for activation of a self-activating hydroprocessing catalyst which comprises contacting a self-activating catalyst, as hereinafter described, with steam. Preferable, the steam (or water which can be converted to steam) is added to or incorporated into the heavy hydrocarbon feedstock which is subsequently brought into contact with the self-activating catalyst. The steam may also be introduced directly into the reactor vessel containing the self-activating catalyst. The amount of steam brought into contact with the self-activating catalyst may vary, but typically is in the range of from 0.01 wt. % to 10 wt. %, based on the weight of the feedstock. Preferably the amount of steam brought into contact with the self-activating catalyst is in the range of from 2.0 to 6.0 wt. % based on the weight of the feedstock. The steam may be added to the feedstock as such, or may be added as water, which will be converted to steam at the elevated temperature of the feedstock. The steam may also be introduced directly into the reactor vessel containing the self-activating catalyst.

The additional activity brought about by contacting the self-activating catalyst with steam is very beneficial in that it can result in the lowering of the reactor temperatures required to obtain a product of a given nitrogen, sulfur, asphaltene, microcarbon residue (MCR) or Conradson carbon residue (CCR), and metal content from a feedstock that contains or is contaminated with these components. The lower reactor temperatures resulting from the improved activity provide for energy savings and will extend the life of a catalyst.

The self-activating hydroprocessing catalyst which may be further activated with steam in accordance with the present method generally comprises a calcined particle comprising a co-mulled mixture made by co-mulling inorganic oxide powder, molybdenum trioxide powder, and a nickel compound and then forming the co-mulled mixture into a particle that is calcined to thereby provide the calcined particle. The calcined particle comprises molybdenum that is present in an amount in the range of from 1 to 10 weight percent, as metal and based on the total weight of the calcined particle, and nickel that is present in an amount such that the weight ratio of nickel-to-molybdenum is less than 0.4. The calcined particle further has a pore size distribution such that less than 70% of the total pore volume of the calcined particle is in its pores having a diameter in the range of from 70 Å to 150 Å, and at least 10% of the total pore volume of the calcined particle is in its pores having a diameter in the range of from 130 Å to 300 Å, and from 1% to 10% of the total pore volume of the calcined particle is in its pores having a diameter greater than 1000 Å.

The activation method of the present invention is particularly applicable to the further activation of self-activating hydroprocessing catalysts employed in the hydrotreatment of heavy hydrocarbon feedstocks that have significant concentrations of sulfur, nitrogen, metals such as vanadium and nickel, and Conradson carbon and microcarbon residue carbon. Self-activating hydroprocessing catalysts are unique in that when they are used in the treatment of hydrocarbon feedstocks their activity actually increases with use. In contrast, the activity of most prior art hydroprocessing catalysts tend to decrease with use.

It has been found that the activity of such self-activating hydroprocessing catalysts can be further increased by contacting the self-activating catalysts with steam. This is very surprising in that the presence of significant amounts of water or steam in a hydrocarbon feedstock to be hydrotreated is generally considered to be detrimental to catalyst performance in that it can cause sintering and agglomeration of metals and loss of catalyst surface area.

The self-activating hydroprocessing catalysts which can be further activated by the present method comprise a co-mulled mixture of inorganic oxide powder, molybdenum trioxide powder, and a nickel compound, wherein the co-mulled mixture has been formed into a particle that is calcined to thereby provide the calcined particle. The calcined particle further has a specifically defined pore size distribution as described elsewhere herein. The calcined particle may itself be used as a self-activating hydroprocessing catalyst or it may be used as a component thereof.

The calcined particle generally comprises an inorganic oxide, molybdenum, and nickel, wherein the molybdenum content of the calcined particle is in the range of from 1 to 10 weight percent (wt. %) of the total weight of the calcined particle, calculated as metal, regardless of its actual form, or, in other words, of from 1.5 wt. % to 15 wt. % molybdenum trioxide ($MoO_3$).

It is desirable for the molybdenum to be present in the calcined particle in an amount that is less than 9.5 wt. % (i.e., 14.25 wt. %, calculated as $MoO_3$) and at least 1.5 wt. % (i.e., 2.25 wt. %, calculated as $MoO_3$). In a preferred embodiment, the concentration of molybdenum in the calcined particle is in the range of from 2 wt. % to 9 wt. % (i.e., from 3 wt. % to 13.5 wt. %, calculated as $MoO_3$), and, in a more preferred embodiment, the concentration is in the range of from 2.5 wt. % to 8.5 wt. % (i.e., 3.75 wt. % to 12.75 wt. %, calculated as $MoO_3$). A most preferred concentration range of molybdenum in the calcined particle of the invention is from 3 wt. % to 8 wt. % (i.e., 4.5 wt. % to 12 wt. %, calculated as $MoO_3$).

An important aspect of the self-activating catalysts which are further activated by the method of the invention is that the calcined particle has a particularly low concentration of nickel such that the weight ratio of nickel-to-molybdenum in the calcined particle is at least or greater than 0.01:1. It is further desirable for the weight ratio of nickel-to-molybdenum in the calcined particle to be less than 0.4:1. Generally, the weight ratio of nickel-to-molybdenum in the calcined particle is to be in the range of from 0.01:1 to 0.35:1. It is preferred for the weight ratio of nickel-to-molybdenum of the calcined particle to be in the range of from 0.01:1 to 0.3:1. The weight ratio is calculated and presented on an elemental basis.

Expressed in terms of atomic ratio, the calcined particle should have an atomic ratio of nickel-to-molybdenum of at least or greater than 0.01:1. It further can be desirable for the atomic ratio of nickel-to-molybdenum in the calcined particle to be less than 0.4:1. Generally, the atomic ratio of nickel-to-molybdenum in the calcined particle is in the range of from 0.01:1 to 0.35:1, and, preferably, within this range, the atomic ratio of nickel-to-molybdenum of the calcined particle is to be in the range of from 0.01:1 to 0.3:1.

The amount of inorganic oxide of the calcined particle may be in the range upwardly to about 98 weight percent of the calcined particle. Typically, the inorganic oxide of the calcined particle is present in an amount in the range of from 70 to 98 weight percent, and, preferably, from 75 to 98 weight percent of the calcined particle.

It further may be desirable for the calcined particle to have a material absence of cobalt. While it is not known with any certainty, it is thought that the presence of a material amount of cobalt in the calcined particle may negatively affect the self activation properties of the composition and, therefore, an amount of cobalt that might adversely impact the self activation properties of the calcined particle when it is used in the hydroprocessing of a heavy hydrocarbon feedstock having a concentration of nickel should not be present in the calcined particle.

What is meant herein by the phrase "a material absence of cobalt" is that the composition contains, if any, cobalt at such a concentration that it does not materially affect the self activation attributes of the calcined particle when it is used in the hydrotreating, e.g., hydrodesulfurization, of a heavy feedstock having a concentration of nickel. The heavy feedstock and nickel concentrations are defined in detail elsewhere herein.

The material absence of cobalt typically will mean that the calcined particle can comprise less than 0.1 weight percent (wt. %) cobalt, calculated as metal and based on the total weight of the calcined particle, regardless of the actual form of the cobalt. Preferably, the cobalt is present in the calcined particle at a concentration of less than 0.075 wt. % and, more preferably, less than 0.05 wt. %. The calcined particle may also have a substantial absence of cobalt.

An important feature of the self-activating catalysts which are further activated with steam in accordance with the present method is their pore structure. The combination of a specific pore structure, as defined herein, and a relatively low concentration of nickel is believed to provide for the unique self activation characteristics of the calcined particle when it is used to hydrotreat hydrocarbon feedstocks, and, in particular, heavy hydrocarbon feedstocks having concentrations of nickel. It is thought that the presence of a material, but not too large of, a percentage of the total pore volume of the calcined particle being present in the macropores of greater than 1000 Å along with a relatively large proportion of the total pore volume being present in the moderate size mesopores in the range of from 70 Å to 150 Å provide the right structure that contributes to the mechanism described above and allows for the migration and transportation of nickel into suitable spots within the pores of the composition.

It is also important that the pore structure of the calcined particle have at least 1 percent (%) of its total pore volume to be contained in its pores having a diameter greater than 1000 Å. Also, the calcined particle is to have less than 10% of its total pore volume that is contained in the pores having a diameter greater than 1000 Å. It is preferred that from 2% to 10% of the total pore volume of the calcined particle to be present in its pores having a diameter of greater than 1000 Å, and, more preferred, from 3% to 9% of the total pore volume of the calcined particle is in the pores of diameter greater than 1000 Å.

Concerning the moderate size mesopores of the calcined particle, at least 40% but less than 70% of the total pore volume of the calcined particle is in its pores having a diameter in the range of from 70 Å to 150 Å. Preferably, from 50% to 70% of the total pore volume of the calcined particle is in its pores having a diameter in the range of from 70 Å to 150 Å.

It further is desirable for at least 10% of the total pore volume of the calcined particle to be present in its pores having a diameter in the range of from 130 Å to 300 Å. Preferably, at least 15%, and, more preferably, at least 20% of the total pore volume of the calcined particle is in the pores having a diameter in the range of from 130 Å to 300 Å.

In preparing the self-activating catalysts which are further activated with steam in accordance with the method of the invention, the starting materials are mixed, preferably by co-mulling, to form a co-mulled mixture. The essential starting materials in the preparation of the co-mulled mixture include molybdenum trioxide that is preferably in the form of finely divided particles that may be as a dry powder or as particles in a suspension or slurry, a nickel component, and an inorganic oxide material. The inorganic oxide material may be selected from the group consisting of alumina, silica and alumina-silica.

The nickel component may be selected from a group of any suitable nickel compounds that are capable of being mixed with the other components of the co-mulled mixture and to be shaped into a particle that is to be calcined to form the calcined particle of the invention. The nickel component may be nickel in an oxide form, such as nickel oxide, or it may be a nickel salt compound. Nickel oxide compounds that may suitably be used include, for example, hydroxides, nitrates, acetates, and oxides of nickel. One preferred nickel compound that may be used in the preparation of the co-mulled mixture is nickel nitrate.

The formation of the co-mulled mixture may be done by any method or means known to those skilled in the art, including, but not limited to, the use of such suitable types of solids-mixing machines as tumblers, stationary shells or troughs, mutter mixers, which are either batch type or continuous type, and impact mixers, and the use of such suitable types of either batch-wise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include, but are not limited to, single or double screw extruders, trough-and-screw mixers and pug mills.

The mixing of starting materials of the calcined particle may be conducted for any suitable time period necessary to properly homogenize the co-mulled mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the co-mulled mixture that is preferably a substantially uniform or homogeneous mixture of the individual components of such co-mulled mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

As already noted, an important aspect of the self-activating catalysts which are further activated with steam in accordance with the inventive method is that at least a major portion of the molybdenum source of the calcined particle be predominantly molybdenum trioxide. In the mixing or co-mulling of the starting materials of the calcined particle, it is preferred for the molybdenum trioxide to be in a finely divided state either as a finely powdered solid or as fine particles in a suspension or slurry. It is best for the particle sizes of the particulate molybdenum trioxide used in the manufacture of the catalyst to have a maximum dimension of less than 0.5 mm (500 microns, μm), preferably, a maximum dimension of less than 0.15 mm (150 μm), more preferably, less than 0.1 mm (100 μm), and, most preferably, less than 0.075 mm (75 μm).

While it is not known with certainty, it is believed that it is advantageous that the molybdenum trioxide used in the self-activating catalysts which are further activated by the present method, be in the form of as small particles as is practically possible; so, therefore, it is not desired to have a lower limit on the size of the molybdenum trioxide particles used in the manufacture of the calcined particle. However, it is understood that the particle size of the molybdenum trioxide used in the manufacture of the calcined particle will generally have a lower limit to its size of greater than 0.2 microns. Thus, the particle size of the molybdenum trioxide used in the formation of the co-mulled mixture in the manufacture of the inventive calcined particle is preferably in the range of from 0.2 to 150 μm, more preferably, from 0.3 to 100 μm, and, most preferably, from 0.5 to 75 μm. Typically, the size distribution of the molybdenum trioxide particles, whether in a dry powder or a suspension or otherwise, is such that at least 50 percent of the particles have a maximum dimension in the range of from 2 to 15 μm.

Once the starting materials of the calcined particle are properly mixed and formed into the shaped or formed particles, a drying step may advantageously be used for removing certain quantities of water or volatiles that are included within the co-mulled mixture or formed particles. The drying of the formed particles may be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 450° C. (842° F.) to 900° C. (1652° F.). The temperature conditions at which the particles are calcined can be important to the control of the pore structure of the calcined particle. Due to the presence of the molybdenum trioxide in the formed particles, the calcination temperature required to provide for a calcined particle having the required pore structure is higher than typical temperatures required to calcine other compositions containing inorganic oxide materials, especially those that do not contain molybdenum trioxide. But, in any event, the temperature at which the formed particles are calcined to provide the calcined particle is controlled so as to provide the calcined particle having the pore structure properties as described in detail herein. The preferred calcination temperature is in the range of from 510° C. (950° F.) to 820° C. (1508° F.), and, most preferably, from 700° C. (1292° F.) to 790° C. (1454° F.).

The calcined particle comprising self-activating catalyst is particularly useful as a high activity hydroprocessing catalyst for use in the hydroprocessing of a heavy feedstock stream that has high contents of pitch, organic metals such as nickel and vanadium compounds, and sulfur. Prior to its use, the calcined particle may, but is not required to, be sulfided. Generally, in its use in the hydroprocessing of a hydrocarbon feedstock, the self-activating catalyst is contained within a reaction zone, such as that which is defined by a reactor vessel, wherein a hydrocarbon feedstock is contacted with the self-activating catalyst under suitable hydroprocessing reaction conditions and from which a treated hydrocarbon product is yielded.

In accordance with the present method, after the self-activating catalyst is placed in the reaction zone and contacted with the hydrocarbon feedstock, the self-activating catalyst is further activated by contacting the catalyst with steam. This can be conveniently accomplished by adding steam to the hydrocarbon feedstock prior to contacting the feedstock with the self-activating catalyst, or by adding steam directly to the reactor vessel containing the self-activating catalyst. The addition of steam may be initiated at the beginning of a run, or at any time after the run has started. In order to get the full benefit of steam activation, it is preferred that the addition of steam occurs fairly early in the run, i.e., within the first week, although the benefits of steam activation have been obtained when steam was added much later in the run.

The preferred hydrocarbon feedstock for use in the present activation method is a heavy hydrocarbon feedstock. The heavy hydrocarbon feedstock may be derived from any of the high boiling temperature petroleum cuts such as atmospheric tower gas oils, atmospheric tower bottoms, vacuum tower gas oils, and vacuum tower bottoms or resid. It is a particularly useful aspect of the inventive process to provide for the hydroprocessing of a heavy hydrocarbon feedstock that can be generally defined as having a boiling temperature at its 5% distillation point, i.e. T(5), that exceeds 300° C. (572° F.) as determined by using the testing procedure set forth in ASTM D-1160. The invention is more particularly directed to the hydroprocessing of a heavy hydrocarbon feedstock having a T(5) that exceeds 315° C. (599° F.) and, even, one that exceeds 340° C. (644° F.).

The heavy hydrocarbon feedstock further may include heavier hydrocarbons that have boiling temperatures above 538° C. (1000° F.). These heavier hydrocarbons are referred to herein as pitch, and, as already noted, it is recognized that one of the special features of the inventive catalyst or process is that it is particularly effective in the hydroconversion of the pitch content of a heavy hydrocarbon feedstock. The heavy hydrocarbon feedstock may include as little as 10 volume percent pitch or as much as 90 volume percent pitch, but, generally, the amount of pitch included in the heavy hydrocarbon feedstock is in the range of from 20 to 80 volume percent. And, more typically, the pitch content in the heavy hydrocarbon feedstock is in the range of from 30 to 75 volume percent.

Another special feature of the present method for further activating a self-activating catalyst used in the hydroprocessing of a heavy hydrocarbon feedstock, is that it provides for the significant reduction of microcarbon residue (MCR) in the feedstock, e.g., from 8% in the absence of steam down to 3% or below in the presence of steam. MCR is measured by the use of testing method ASTM D-4530.

The heavy hydrocarbon feedstock further may include a significantly high sulfur content. One of the special features of the activation method of the invention is that it provides for the desulfurization and demetallization of the heavy hydrocarbon feedstock. The sulfur content of the heavy hydrocarbon feedstock is primarily in the form of organic sulfur-containing compounds, which may include, for example, mercaptans, substituted or unsubstituted thiophenes, heterocyclic compounds, or any other type of sulfur-containing compound.

A feature of the present method for further activating a self activating catalyst is that it provides for the desulfurization of the heavy feedstock that has a significantly high sulfur content, such as a sulfur content that is typically greater than 1 weight percent, so as to provide for a treated hydrocarbon product having a reduced sulfur content, such as a sulfur content of less than 1 weight percent, preferably, less than 0.75 wt. %, and, more preferably, less than 0.5 wt. %.

When referring herein to the sulfur content of either the heavy hydrocarbon feedstock or the treated hydrocarbon product, the weight percents are determined by the use of testing method ASTM D-4294.

The inventive method for activating a self-activating catalyst is particularly useful in the processing of a heavy hydrocarbon feedstock that has a sulfur content exceeding 2 weight percent, and with such a heavy hydrocarbon feedstock, the sulfur content may be in the range of from 2 to 8 weight percent. The inventive activation method is especially useful in the processing of a heavy hydrocarbon feedstock having an especially high sulfur content of exceeding 3 or even 4 weight percent and being in the range of from 3 to 7 weight percent or even from 4 to 6.5 weight percent.

The inventive method for activating a self-activating catalyst is suitable for the hydroprocessing of the heavy hydrocarbon feedstock to provide for the simultaneous desulfurization, denitrogenation, conversion of microcarbon residue, and removal of vanadium and nickel. In this method, the heavy hydrocarbon feedstock and steam is contacted with the inventive catalyst under suitable hydrodesulfurization and hydroconversion process conditions and the treated hydrocarbon product is yielded.

One embodiment of the inventive method is the processing of a heavy hydrocarbon feedstock that has a significant concentration of nickel, and, as noted above, a significant feature of this embodiment of the inventive method is the activation of a self-activating catalyst having unique physical characteristics and specific metals loading and relatively low nickel content in combination with the heavy hydrocarbon feedstock having a significant nickel content. It is believed that, with the use of a self-activating catalyst having low nickel content in the treatment of the nickel-containing heavy hydrocarbon feedstock, the activity of catalyst improves as the nickel from the heavy hydrocarbon feedstock is deposited upon or taken up by the catalyst.

The nickel content of the heavy hydrocarbon feedstock of the inventive method, thus, has a concentration of contaminant nickel that is typically in the form of organic nickel compounds. The nickel concentration of the heavy hydrocarbon feedstock typically can be in the range of from 1 ppmw to 250 ppmw. It is desirable for the hydrocarbon feedstock of the inventive process to have a concentration of nickel that is in the range of from 5 ppmw to 225 ppmw, and, it is more desirable for the nickel concentration to be in the range of from 7 ppmw to 200 ppmw.

The heavy hydrocarbon feedstock may also have a vanadium concentration that may typically be in the range of from 5 ppmw to 250 ppmw. It is desirable for the heavy hydrocarbon feedstock to contain as little vanadium as possible, but, the inventive method provides for demetallization, and, thus, the removal of vanadium from the heavy hydrocarbon feedstock. More typically, the vanadium concentration of the heavy hydrocarbon feedstock is in the range of from 10 ppmw to 225 ppmw.

The treated hydrocarbon product should have a reduced sulfur content that is below that of the heavy hydrocarbon feedstock, such as a sulfur content of less than 1 weight percent. It is recognized that the inventive method, however, may have the capability of effectively desulfurizing the heavy hydrocarbon feedstock to provide the treated hydrocarbon product having a reduced sulfur content of less than 0.5 and even less than 0.4 weight percent based on the amount of catalyst used relative to feed volume. The heavy hydrocarbon feedstock treated with the steam activated self-activating catalyst should also have a reduced MCR that is below that of the heavy hydrocarbon feedstock, such as a MCR of 8% or less, preferably 3% or less.

The self-activating catalyst which is further activated by the present method may be employed as a part of any suitable reactor system that provides for the contacting of the catalyst with the heavy hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of a self-activating catalyst contained within a reactor vessel equipped with a reactor feed inlet means, such as a feed nozzle, for introducing the heavy hydrocarbon feedstock and the appropriate amount steam into the reactor vessel, and a reactor effluent outlet means, such as an effluent outlet nozzle, for withdrawing the reactor effluent or the treated hydrocarbon product from the reactor vessel.

The inventive activation method is generally operated at a hydroprocessing (hydroconversion and hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig). The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone in the inventive method is generally such as to provide a liquid hourly space velocity (LHSV) in the range of from 0.01 $hr^{-1}$ to 3 $hr^{-1}$. The term "liquid hourly space velocity", as used herein, means the numerical ratio of the rate at which the heavy hydrocarbon feedstock is charged to the reaction zone of the inventive method in volume per hour divided by the volume of catalyst contained in the reaction zone to which the heavy hydrocarbon feedstock is charged. The preferred LHSV is in the range of from 0.05 $hr^{-1}$ to 2 $hr^{-1}$, more preferably, from 0.1 $hr^{-1}$ to 1.5 $hr^{-1}$ and, most preferably, from 0.2 $hr^{-1}$ to 0.7 $hr^{-1}$.

It is preferred to charge hydrogen along with the heavy hydrocarbon feedstock and steam to the reaction zone of the inventive method. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The following examples are presented to further illustrate the invention, but they are not to be construed as limiting the scope of the invention.

EXAMPLE I

This example describes the preparation of Catalyst A, which is representative of one embodiment of a self-activating catalyst which may be further activated with steam in accordance with the inventive method.

Catalyst A

Catalyst A was prepared by first combining 2100 parts by weight alumina, containing nominal 2% silica, 63.17 parts by weight nickel nitrate ($Ni(NO_3)_2$) dissolved in 85.04 parts by weight deionized water by heating, 217.05 parts by weight molybdenum trioxide (MoO3) powder, and 900 parts by weight crushed regenerated Ni/Mo/P hydrotreating catalyst within a Muller mixer along with 130 parts by weight 69.9% concentrated nitric acid and 30 grams of a commercial extrusion aid. A total of 3222.9 parts by weight of water was added to these components during the mixing. The components were mixed for approximately 30 minutes. The mixture had a pH of 4.12 and an LOI of 55.21 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a temperature of 704° C. (1300° F.). The final calcined mixture contained 2.2 weight percent nickel metal (2.8 wt. % as NiO), and 7.9% molybdenum metal (11.9 wt. % as $MoO_3$) and 83.6 weight percent of alumina, containing nominal 2% silica, and 0.7% of phosphorus.

The following Table 1 presents certain properties of the dried and calcined extrudate particles. As may be seen from the pore properties of the calcined extrudate presented in Table 1 that the percentage of the total pore volume contained in the macropores having a pore diameter of greater than 1000 Angstroms (Å) is at least or greater than 1% but less than 10% percent. The percentage of the total pore volume that is contained in the pores having a pore diameter in the range of from 70-150 Å is at least or greater than 40% but less than 70%. And, the percentage of total pore volume that is contained in the pores having a pore diameter in the range of from 100-150 Å is less than 70%. It is also significant to note that at least 10% of the total pore volume is contained in pores having a diameter in the range of from 150 to 300 Å with at least 10% of the total pore volume being contained in pores having a diameter in the range of form 130 Å to 300 Å.

TABLE 1

| Properties of Catalyst A | |
|---|---|
| Properties Calcination Temperature | 704° C. (1300° F.) |
| $MoO_3$ | 11.85 |
| NiO | 2.75 |
| Hg Pore Size Dist. (Angstroms) | Percent |
| <70 | 2.86 |
| 70-100 | 16.4 |
| 100-130 | 37.24 |
| 130-150 | 13.26 |
| 150-180 | 7.09 |
| 180-200 | 2.53 |
| 200-240 | 2.97 |
| 240-300 | 2.65 |
| 300-350 | 1.51 |
| 350-450 | 1.9 |
| 450-600 | 1.8 |
| 600-1000 | 2.73 |
| 1000-3000 | 5.84 |
| 3000-5000 | 1.22 |
| >5000 | 0 |
| <100 Å | 19.3 |
| 100-150 Å | 50.5 |
| 150-300 Å | 15.3 |
| >300 Å | 15.0 |
| >1000 Å | 7.1 |
| >5000 Å | 0 |
| Total Pore Volume, cc/g | 0.66 |
| Median Pore Diameter, Å | 124 |

EXAMPLE II

This example describes the preparation of Catalyst B, which is representative of another embodiment of a self-activating catalyst which may be further activated with steam in accordance with the present method.

Catalyst B

Catalyst B was prepared by first combining 2100 parts by weight alumina, 63.17 parts by weight nickel nitrate (Ni(NO$_3$)$_2$) dissolved in 85.04 parts by weight deionized water by heating, 217.05 parts by weight molybdenum trioxide (MoO$_3$) powder, and 900 parts by weight crushed Ni/Mo/P hydrotreating catalyst within a Muller mixer along with 130 parts by weight 69.9% concentrated nitric acid and 30 parts of a commercial extrusion aid. A total of 3222.9 parts by weight of water was added to these components during the mixing. The components were mixed for approximately 30 minutes. The mixture had a pH of 4.12 and an LOI of 55.21 weight percent. The mixture was then extruded using 1.3 mm trilobe dies to form 1.3 trilobe extrudate particles. The extrudate particles were then dried in air for a period of several hours at a temperature of 100° C.

Dried extrudate particles were calcined in air for approximately a period of two hours at a maximum temperature of 788° C. (1450° F.). The final calcined mixture contained 2.2 weight percent nickel metal (2.8 wt. % as NiO), 7.9% molybdenum metal (11.9 wt. % as MoO$_3$), 82.6 weight percent of alumina, and 0.7% phosphorus.

The following Table 2 presents certain properties of the dried and calcined extrudate particles. As may be seen from the pore properties of the calcined extrudate presented in Table 2, the percentage of the total pore volume contained in the macropores having a pore diameter of greater than 350 (Å) is less than 20% with at least 1% of its pore volume is contained in pores having a diameter greater than 1000 Å, and the percentage of the total pore volume that is contained in its pores having a pore diameter in the range of from 70-250 Å is greater than 90%. The median pore diameter is at least greater than 115 Å and less than 155 Å.

TABLE 2

Properties of Catalyst B

| Properties Calcination Temperature | 788° C. (1450° F.) |
|---|---|
| MoO$_3$ | 11.85 |
| NiO | 2.75 |

| Range | Pore Volume - cc/g |
|---|---|
| 70-100 | 4.76 |
| 100-130 | 35.96 |
| 130-150 | 26.26 |
| 150-200 | 19.04 |
| 200-240 | 3.53 |
| 240-300 | 3.00 |
| 300-350 | 1.23 |
| 350-450 | 1.59 |
| 450-600 | 1.23 |
| 600-1000 | 1.06 |
| 1000-5000 | 1.23 |
| >5000 | 0.88 |
| <70 | 0.18 |
| Total Pore Volume, cc/g | 0.66 |
| Median Pore Diameter, Å | 124 |

EXAMPLE III

In this example a self-activating catalyst having a composition and properties similar to Catalyst A was employed to hydroprocess a demetallized Arabian residue having the distillation properties (as determined by ASTM Method D 7169) and other properties shown in Tables 3 and 4, respectively.

TABLE 3

Distillation Properties of Demetallized Arabian Residue

| Wt. % | Temperature (° F.) |
|---|---|
| IBP | 315 |
| 10 | 582 |
| 20 | 693 |
| 30 | 777 |
| 40 | 848 |
| 50 | 918 |
| 60 | 990 |
| 70 | 1069 |
| 80 | 1159 |
| 90 | 1283 |
| FBP | 1351 |

TABLE 5

Other Properties of the Feedstock

| H (wt %) | 12.16 |
|---|---|
| C (wt %) | 86.60 |
| N (wt %) | 0.18 |
| S (wt %) | 1.06 |
| Ni (ppm) | 8 |
| V (ppm) | 17.5 |
| GN (ppm) | 462 |
| MCR | 6.7 |
| 1000 F.+, wt % | 38.7 |
| C$_7$-asph, wt % | 2.2 |
| Density | 0.9322 |
| C$_5$-asph, wt % | 3.5 |

A demetallized Arabian residue feedstock having the properties described above, along with hydrogen, was charged to a reactor loaded with a self-activating hydroprocessing catalyst having a composition and properties similar to Catalyst A. The reactor was maintained at a pressure of approximately 130 bar, and the residue feedstock was charged at a rate so as to provide a liquid hourly space velocity (LHSV), of 0.5 hr$^{-1}$, while the hydrogen was charged at a H$_2$/oil rate of 590 Nm$^3$/m$^3$. The temperature of the reactor was set at 373.9° C. (705° F.). The run was continued for over 4000 hours.

During the first 3,100 hours of the run, the self-activating catalyst was not contacted with steam. From 3,100 hours to 4,000 hours the self-activating catalyst was contacted with steam at a rate of 3.27 wt. % steam based on weight of the residue feedstock. The use of steam was discontinued after 4000 hours.

Presented in FIG. 1 is a plot of the weight percent total sulfur conversion achieved by self-activating Catalyst A in the hydrotreatment of the demetallized Arabian residue with and without steam addition. As can be seen from FIG. 1, the percentage of sulfur conversion (which is indicative of the activity of the self-activating catalyst) steadily improved over the first part of the run up to 2500 hours, and then began to stabilize between 2,500 and 3,000 hours at around 60 wt. %. However, with the addition of steam to the residue feedstock at around 3100 hours, the sulfur conversion activity of the self-activating catalyst significantly improved to around 70 wt. %, which was quite unexpected. When the addition of steam was discontinued at around 4,000 hours, the sulfur conversion rate returned to the around 60 wt. % level experienced prior to the addition of steam, which confirms the addition of steam was the cause of the improved further activity.

Presented in FIG. 2 is a plot of the weight percent microcarbon residue (MCR) conversion achieved by self-activating Catalyst A in the hydrotreatment of the demetallized Arabian residue with and without steam addition. As can be seen from FIG. 2, the MCR conversion activity was on the order of 20 to 30 wt. % during the first part of the run up to 3,100 hours. However, upon the addition of steam to the residue feedstock at around 3,100 hours, the MCR conversion activity of the self-activating catalyst significantly improved to a surprising 70 to 80 wt. %. When the addition of steam was discontinued at around 4,000 hours, the MCR conversion rate returned to the 20 to 30 wt. % range experienced prior to the addition of steam.

The invention claimed is:

1. A method, comprising:
co-mulling an inorganic oxide powder, molybdenum trioxide powder in the form of finely divided particles having a maximum dimension of less than 500 microns and a nickel compound to thereby form a co-mulled mixture;
forming said co-mulled mixture into a particle;
calcining said particle at a controlled calcination temperature in the range of from 700° C. to 790° C. for a calcination time period that is effective to provide a calcined particle consisting essentially of an inorganic oxide, molybdenum that is present in an amount in the range of from 1 to 10 weight percent, as metal and based on the total weight of said calcined particle, and nickel that is present in an amount such that the weight ratio of said nickel-to-said molybdenum is less than 0.4, and wherein said calcined particle has a pore size distribution such that less than 70% of the total pore volume of said calcined particle is in the pores of said calcined particle having a diameter in the range of from 70 Å to 150 Å, at least 10% of the total pore volume of said calcined particle is in the pores of said calcined particle having a diameter in the range of from 130 Å to 300 Å, and at least 1%, but less than 10%, of the total pore volume of said calcined particle is in the pores having a diameter greater than 1000 Å; and
contacting said calcined particle with a heavy hydrocarbon having a nickel content in the range of from 1 ppmw to 250 ppmw, a vanadium content in the range of from 5 ppmw to 250 ppmw, and a steam content in the range of from 0.01 wt % to 10 wt %, based on the weight of said heavy hydrocarbon feedstock, under conditions to provide a self-activating catalyst.

2. A The method as recited in claim 1, wherein said steam content of said heavy hydrocarbon feedstock is in the range of from 2 wt % to 6 wt % based on the weight of the heavy hydrocarbon feedstock.

3. The method as recited in claim 2, wherein the heavy hydrocarbon feedstock has a Sulfur content in the range of from 2 wt % to 8 wt %.

4. The method as recited in claim 3, wherein the heavy hydrocarbon feedstock contains from 10 volume percent pitch to 90 volume percent pitch.

5. The method as recited in claim 4, wherein said self-activating catalyst is capable of providing the conversion of the microcarbon residue (MCR) in said heavy hydrocarbon feedstock of at least 50 weight percent.

6. The method as recited in claim 5, wherein the sulfur conversion activity of said self-activating catalyst is improved at least 10 weight percent.

7. The method as recited in claim 6, wherein from 3% to 9% of the total pore volume of said calcined particle is in pores of a diameter greater than 1000 Å.

8. The method as recited in claim 7, wherein said heavy hydrocarbon feedstock contains from 30 volume percent pitch to 75 volume percent pitch.

* * * * *